United States Patent [19]

Compton

[11] 4,358,212
[45] Nov. 9, 1982

[54] HIGH COMPRESSION THIMBLE

[76] Inventor: William E. Compton, 999 Beach Rd., Sanibel Island, Fla. 33957

[21] Appl. No.: 277,094

[22] Filed: Jun. 25, 1981

[51] Int. Cl.$^3$ .............................................. F16G 11/00
[52] U.S. Cl. .................................. 403/210; 24/115 K
[58] Field of Search ...................... 403/210, 211, 212; 24/115 K, 115 H

[56] References Cited

U.S. PATENT DOCUMENTS

| 2,278,717 | 4/1942 | Burns | 403/210 |
| 2,403,057 | 7/1946 | Davis | 403/210 X |
| 3,932,697 | 1/1976 | Hood | 403/210 X |

FOREIGN PATENT DOCUMENTS

| 6607250 | of 1966 | Netherlands | 403/210 |
| 548737 | 3/1977 | U.S.S.R. | 403/210 |

Primary Examiner—Andrew V. Kundrat
Attorney, Agent, or Firm—Alfred E. Wilson

[57] ABSTRACT

A high compression thimble is disclosed for use with fiber and particularly wire rope, either spliced thereto or used with compression sleeves. A ring is securely welded within an enlarged semi-circular lower end of the thimble to snugly receive an attachment device, such as a pin therethrough, and the thimble is particularly adapted for high stress uses such as the securement of marine rigging ends as well as other uses involving heavy equipment or the like.

5 Claims, 5 Drawing Figures

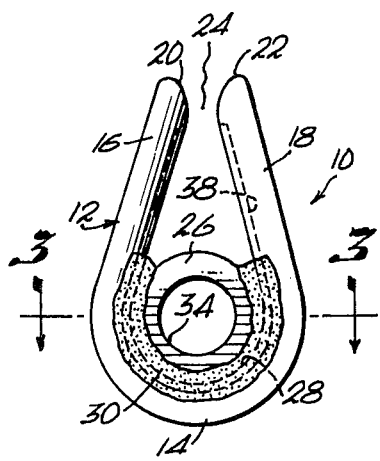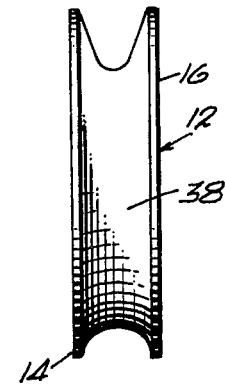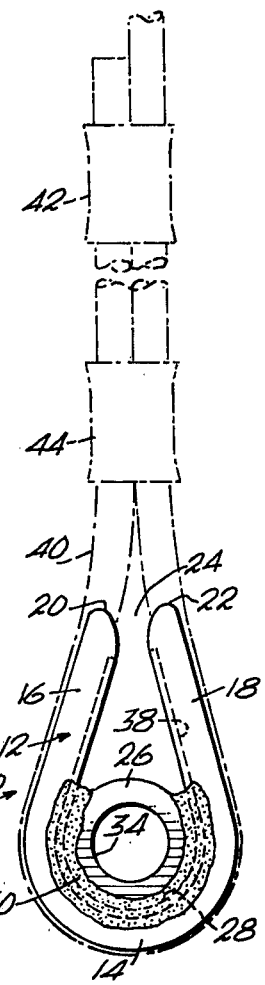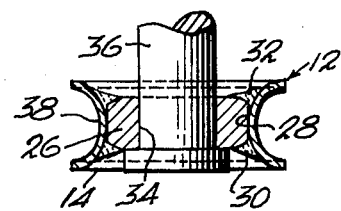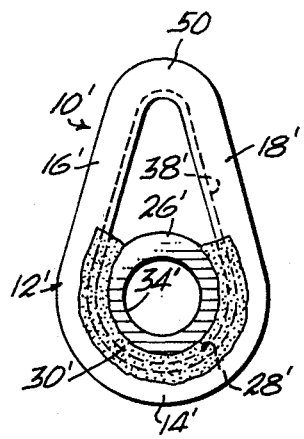

HIGH COMPRESSION THIMBLE

BACKGROUND OF THE PRESENT INVENTION

The present invention pertains to thimbles of a type commonly used for the securement of various types of rope ends, and more particularly to a thimble of this type which is adapted to withstand very high stresses and compression forces for very long periods of time without failure.

Presently used thimbles provide enlarged lower ends of a substantially greater radii than the pin or other anchor means passing therethrough. Therefore, after prolonged periods of usage, under substantial stress forces, the thimbles frequently become elongated or compressed, resulting in eventual failure.

Therefore, one of the principal objects of the present invention is to provide a thimble of the above described type which will withstand very high stress forces for very long periods of time without becoming elongated or compressed, resulting in an almost unlimited life expectancy.

Another object of the invention is to provide a thimble which can be constructed of an appropriate metal which is compatible with a wire rope used therewith, thereby eliminating failure thereof because of galvanic action.

A further object of the invention is to provide a ring, formed of an appropriate metal, which is diametrically sized to snugly fit within the enlarged semicircular lower end portion of a generally conventional thimble, and to securely weld the ring in place about the area of contact with the thimble.

Yet another object of the invention is to provide the central hole of the ring in a diametric size to snugly receive attachment means such as a pin, therethrough.

Another object of the invention is to provide the thimble in a range of sizes with companionately sized central holes for use with a range of attachment pin or bolt sizes.

BRIEF DESCRIPTION OF THE DRAWINGS

FIG. 1 is a face view of the thimble of the present invention;

FIG. 2 is an edge view of the thimble of FIG. 1;

FIG. 3 is a cross sectional view taken along the line 3—3 of FIG. 1;

FIG. 4 is a view similar to FIG. 1 with a rope, such as wire rope, illustrated in phantom, secured thereon by compression sleeve means; and FIG. 5 is a view similar to FIG. 1 illustrating a modified form of thimble of the present invention.

DETAILED DESCRIPTION OF THE INVENTION

With reference to the drawings, and particularly to FIG. 1, the thimble of the present invention, designated generally at 10, includes a main, generally horse shoe configuration frame portion 12, comprised of an enlarged semi-circular bottom or base portion 14 with a pair of outwardly converging arm portions 16 and 18, formed integrally therewith. Respective tip end portions 20, 22 are spaced apart to define an open throat 24.

As best illustrated in FIGS. 1 and 3, a ring 26, sized to snugly fit the inside periphery 28 of bottom portion 14, is securely welded at 30, 32 about both sides of said periphery 28. As will be observed from a consideration of FIGS. 1, 3, 4 and 5 the weldments 30 and 32 extend around approximately 285° of the circumference of the ring 26 so as to provide a solid metal structure extending all the way around the semi-circular bottom or base 14 of the thimble 10 that is subjected to a crushing load. It will of course be understood that the metal of the thimble 10, the ring 26 and the weld material can be formed of hard metal of the exotic types to still further increase the strength of the assembly. A central hole 34 of ring 26 is diametrically sized to snugly slidably receive therethrough a suitable securing means such as a headed pin 36, FIG. 3.

A continuous outwardly opening groove 38 is defined about the base and arm portions 14, 16 and 18 to receive a rope thereabout, such as a wire rope, illustrated in phantom at 40, FIG. 4, which is secured by compression sleeves 42, 44. However, any type of rope is adaptable to the thimble 10 and may be conventionally secured thereto by compression sleeves, by splicing or other applicable means.

FIG. 5 illustrates a modified thimble 10', of a type commonly called a pear thimble, and which is similar in all respects to the above described form with the exception of the continuous top end closure 50. All other portions and elements thereof are given like reference numerals, relative to FIGS. 1 through 4, with prime designations.

In one preferred form, the thimble of the present invention is roll formed of any suitable metal such as stainless steel, for example. It will be obvious to those skilled in the art that, with the ring 26 being sized to snugly fit within the semi-circular base portion 14 and being securely welded about both sides of the contact area, it is virtually impossible for the thimble to elongate or straighten out after extended periods of time under very substantial stress forces. Various sizes of thimbles will be provided for a variety of different uses, and with appropriately sized holes 34 to accommodate various sized attachment means, such as pin 36.

Many prior art devices are comprised only of a frame such as 12 or 12' which is simply engaged about means such as pin 36 or a bolt of various sizes, often considerably smaller in diameter than the semi-circular base portion 14. When used, for example, to hold the mast of a large sail boat and being subjected to the very substantial sustained forces of the wind in the sails, the thimbles gradually elongate or straighten out and if not detected and replaced, they eventually fail completely.

While a preferred form of the invention has been herein disclosed, it will be obvious to those skilled in the art, that various changes and modifications can be made therein without departing from the true spirit of the invention as defined in the appended claims.

I claim:

1. A high compression thimble comprising a main generally horse shoe shaped frame including a semi-circular base portion and a pair of outwardly converging arm portions, a continuously outwardly opening groove defined about the outer periphery of said base arm portions, a one piece cylindrical ring having an outer diameter to snugly fit within the inside periphery of the base portion and having an internal annular aperture to receive therethrough a securing pin, and welding material securely welded between opposite sides of the outer circumference of the ring and the internal diameter of the semi-circular base portion on opposite sides thereof.

2. The thimble as defined in claim 1 wherein said arms include spaced apart outer terminal ends, defining an open throat therebetween.

3. The thimble as defined in claim 1 including a continuous rounded top end closure, connecting between respective extended ends of said arm portions, said top end closure providing a connecting continuation of said outwardly opening groove.

4. The thimble as defined in claim 1 wherein the welding of the ring to the base portion extends around approximately 285° of the circumference of the ring.

5. The thimble as defined in claim 1 wherein the welding between the ring and the base of the thimble extends around the portions of the ring that are subjected to compressive stresses.

* * * * *